United States Patent Office 2,726,966
Patented Dec. 13, 1955

1

2,726,966

FLUORESCENT COATING METHOD

James Thomson Anderson and Harold Francis Ward, Rugby, England, assignors to General Electric Company, a corporation of New York No Drawing. Original application February 4, 1949, Serial No. 74,718, now Patent No. 2,676,894, dated April 27, 1954. Divided and this application December 22, 1952, Serial No. 327,412

Claims priority, application Great Britain April 2, 1948

3 Claims. (Cl. 117—33.5)

This invention relates to the coating of support surfaces with a luminescent material, and more particularly to a binder material used in applying such a coating to an electric discharge device envelope. The present application is a division of our application Serial No. 74,718, filed February 4, 1949, and now Patent No. 2,676,894.

In known processes the powdered luminescent material is suspended in a binder comprising a solution in a suitable solvent of nitrocellulose or other material possessing suitable similar properties, and the suspension is introduced into the interior of the tube to be coated and allowed to drain and dried by passing a current of warm air through the tube. Finally, the tube is heated in an oxidizing atmosphere to remove the binder. If the exterior surface had to be coated, the same result could be obtained by plunging the tube into the suspension.

Many precautions have to be taken with regard to the inflammability, purity and toxicity of the binder and its solvent evaporation rate to produce satisfactory coatings. The object of this invention is to provide a binder which is more favorable with respect to the above criteria.

According to the invention, this binder or vehicle is composed of a water solution of a water-soluble material capable of giving at least a moderately viscous solution and which, when burned, leaves only a small or no residual ash. Suitable materials which may be mentioned are water-soluble cellulose or starch, such as methyl cellulose, glycol cellulose, and salts of alginic acid, such as ammonium and triethanolamine alginates.

The process according to the invention has been found suitable when the luminescent material is a silicate, tungstate, phosphate or borate or a mixture thereof. There is no reason to believe that it is not suitable for use with any known material, the luminescent properties of which are not impaired by water.

It is found that a suitable wetting agent is desirable to give a satisfactory coating. A suitable wetting agent is one which, if it is not removed in the subsequent heating process, leaves a residuum which is not deleterious to the luminescent properties of the material.

The vehicle is first prepared by making a water solution of the water-soluble organic material, and this is diluted so as to obtain the required viscosity. The solution can be filtered if found desirable.

A suspension is then made up with the vehicle and the luminescent powder dispersed in it (either by milling or stirring) and about one per cent of the wetting agent is then added. For the purpose of coating the interior surface of a tube for use in making a fluorescent lamp, the coating is effected by raising the suspension into the tube held vertically by air pressure and then allowing the tube to drain. The deposit is dried by placing in a warm air stream. The tube is then heated to a temperature of 410–450° C. over a period of 3 to 10 minutes, a slow air stream being passed through it in order to remove the residuum of the vehicle. The upper limit of temperature is determined by the necessity for avoiding softening of the glass. The coating process is then complete.

What we claim as new and desire to secure by Letters Patent of the United States is:

1. The process of coating a vitreous surface with powdered luminescent material which includes the steps of flowing over said surface a suspension of said luminescent material in a water solution of a water-soluble cellulose derivative capable of giving at least a moderately viscous solution and selected from the group consisting of methyl cellulose and glycol cellulose, draining the solution from said surface and drying the resultant coating, and thereafter heating the coating so formed to a temperature at which said water-soluble cellulose derivative is dispersed.

2. The process of coating a vitreous surface with powdered luminescent material which includes the steps of flowing over said surface a suspension of said luminescent material in a water solution of a water-soluble cellulose derivative comprising methyl cellulose, draining the solution from said surface and drying the resultant coating, and thereafter heating the coating so formed to a temperature at which said water-soluble cellulose derivative is dispersed.

3. The process of coating a vitreous surface with powdered luminescent material which includes the steps of flowing over said surface a suspension of said luminescent material in a water solution of a water-soluble cellulose derivative comprising glycol cellulose, draining the solution from said surface and drying the resultant coating, and thereafter heating the coating so formed to a temperature at which said water-soluble cellulose derivative is dispersed.

References Cited in the file of this patent

UNITED STATES PATENTS

| | | |
|---|---|---|
| 1,244,058 | Langer | Oct. 23, 1917 |
| 2,297,033 | Stahr | Sept. 29, 1942 |
| 2,317,977 | Casellini | May 4, 1943 |
| 2,512,866 | Mager | June 27, 1950 |
| 2,524,733 | Payne et al. | Oct. 3, 1950 |
| 2,621,134 | Welch | Dec. 9, 1952 |
| 2,676,894 | Anderson et al. | Apr. 27, 1954 |